Aug. 9, 1932. G. R. CHERVENKA 1,870,236
COLLECTOR RING ASSEMBLY AND METHOD OF MAKING SAME
Filed Nov. 22, 1929
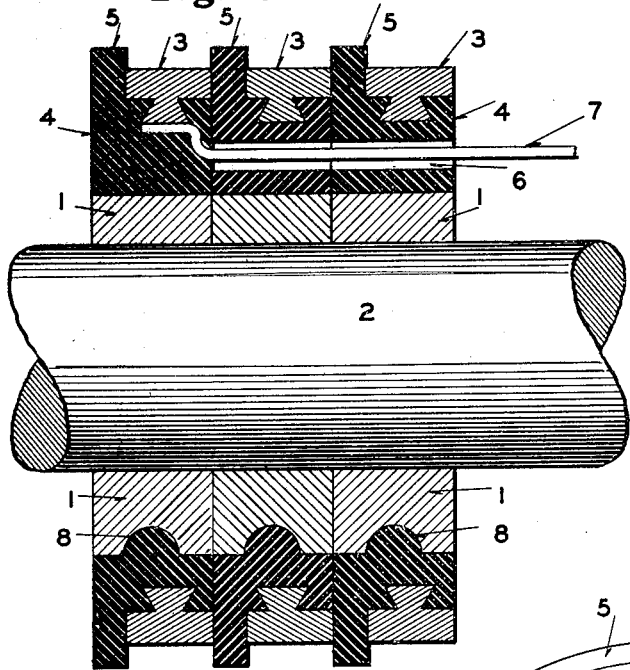
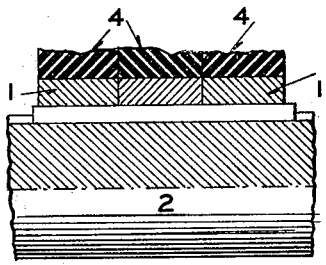
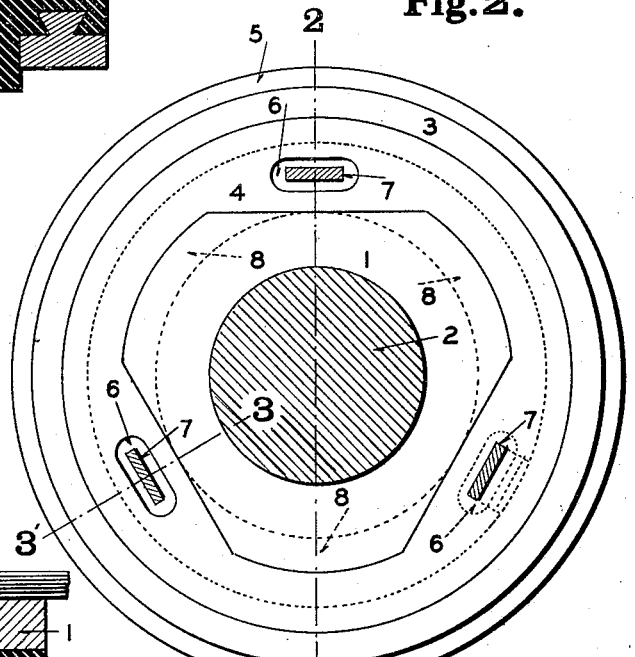
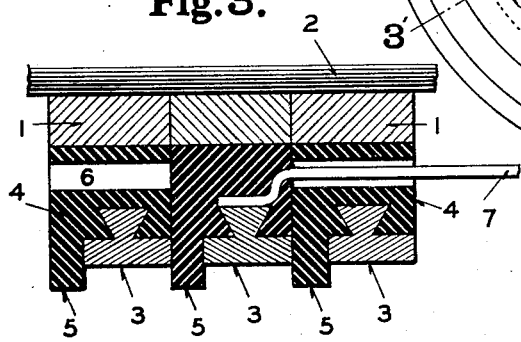
Inventor
G. R. Chervenka
By E. G. Huffman
Att'y.

Patented Aug. 9, 1932

1,870,236

UNITED STATES PATENT OFFICE

GEORGE R. CHERVENKA, OF ST. LOUIS, MISSOURI, ASSIGNOR TO WAGNER ELECTRIC CORPORATION, OF ST. LOUIS, MISSOURI, A CORPORATION OF DELAWARE

COLLECTOR RING ASSEMBLY AND METHOD OF MAKING SAME

Application filed November 22, 1929. Serial No. 408,948.

My invention relates to current collecting devices for dynamo electric machines and particularly to a collector ring assembly and method of making the same.

Heretofore the manufacture of satisfactory collector ring assemblies has presented numerous difficulties, one of these arising from the necessary relative positions of the rings and the conductors leading therefrom, and the care therefore required in providing permanent electrical connection of a conductor with its ring and proper insulation of the conductor from the other rings.

As known to me, two general methods of manufacture of collector ring assemblies have heretofore been employed, one being to press the rings on a cylinder of insulating material, and the other to mold the rings and conductors into a body of a moldable insulating material, such as the phenolic condensation product commercially known as "Bakelite." Both of these methods present numerous difficulties in the proper manufacture of the assembly and applying it to the shaft of a dynamo electric machine.

The object of my invention is to provide an improved method of collector assembly manufacture which not only simplifies mechanical processes and reduces cost, but also avoids all difficulty in connection with the disposition of the collector ring conductors and their perfect insulation. Broadly speaking, my invention comprises forming collector assemblies by means of a plurality of identical units, each comprising a single ring insulatingly mounted on a shaft receiving hub by means of molded insulating material, properly spaced openings being formed through the molded material for the passage of the conductors.

In the accompanying drawing Figure 1 is a cross sectional view (along the line 2—2' of Figure 2) of a collector constructed in accordance with my invention; Figure 2 is an end view of the collector; Figure 3 is a partial cross sectional view of the collector assembly along the line 3—3' of Figure 2; and Figure 4 illustrates one means for making non-rotative connection between the collector units and the shaft of the machine.

As indicated in the drawing, my improved collector assembly comprises a plurality of identical units, each comprising a hub member 1 for mounting on shaft 2 of a dynamo electric machine, a single collector ring 3, and an annular body of molded insulating material 4 physically securing the collector ring to the hub and electrically insulating it therefrom. The insulating body comprises a flanged portion 5 which covers one lateral face of the collector ring and whose diameter is greater than that of the collector ring. This insulating flange not only serves to fill the spaces between the collector rings in the final collector assembly with insulating material, but also serves as a barrier to increase the "creeping" distance between the rings.

Each insulating body 4 is provided with longitudinal openings 6 therethrough for the passage of the collector ring conductors 7. These openings are preferably formed in the molding operation, and in the case of a collector for a 3-phase machine the insulating body of each unit of the assembly is provided with two of such openings spaced 120 degrees apart.

In the manufacture of each unit the conductor is welded to the collector ring and the ring and hub are then placed in a mold and the insulating material, which is preferably a phenolic condensation product in comminuted or plastic condition, is introduced into the mold and compressed in the usual manner to fill the spaces between the parts and form a body of insulating material of the shape described which embraces a portion of the end of the conductor in addition to the part engaging the collector ring and also secures the collector ring and the hub together. To firmly secure the insulating body to the hubs, the peripheral shape of the hubs is preferably made irregular, as indicated in Figure 2, where a portion is flat and a portion is circular, and the circular portion is grooved as indicated at 8 in Figure 1.

A collector assembly is formed by pressing the units on the shaft 2 successively, the units after the first being so positioned, during applying movement, that the conductors for the preceding unit readily pass through the openings 6. In small assemblies a press fit between the shaft and the units of the assembly is sufficient, but in larger units suitable key-ways in the shafts and hubs are preferably formed as indicated in Figure 4, for positively maintaining the units in position.

Since the contacting surfaces of the units are flat and smooth, pressing them together results in a sufficiently close union to prevent the entrance of foreign matter between them.

When collector assemblies are formed in accordance with my invention, the molds required are smaller and less expensive, and the proper position of the metal parts in the mold is more easily accomplished than if it were attempted to mold the entire collector assembly as a unit.

It will also be apparent that my invention has the further advantage that perfect insulation of collector conductors from the rings beneath which they pass is always attained and in a very convenient manner.

Having fully described my invention, what I claim as new and desire to secure by Letters Patent of the United States is:

1. The method of forming a collector ring assembly made up of a plurality of units each embodying a ring, a hub element and an insulating body, which comprises securing a conductor to each ring, securing each ring to a hub element by molding a body of insulating material therebetween, opening being left through said material for the passage of conductors, and bringing said units into assembled relation by passing the conductor of each unit through after assembled units.

2. In a dynamo electric machine, a collector ring assembly consisting of a plurality of separate units mounted on the shaft of the machine in contacting axial alignment, said units each comprising a hub element engaging the shaft, an annular collector ring concentric with the hub, and a body of insulating material securing the ring to the hub and extending laterally of the plane of one end of the ring, the insulating body of each unit having projecting portions interengaging with the ring and other projecting portions interengaging with the hub to prevent relative axial movement of either of said elements with respect to said body, and the insulating body of each unit but one being provided with an opening therethrough between the ring and the hub.

In testimony whereof, I hereunto affix my signature, this 13th day of November, 1929.

GEO. R. CHERVENKA.